United States Patent [19]

Sternisa et al.

[11] 4,443,567

[45] Apr. 17, 1984

[54] SINGLE-COMPONENT HARDENABLE SYNTHETIC RESIN COMPOSITION AND METHOD OF USING SAME

[75] Inventors: Danilo Sternisa, Emmendingen; Herbert Kistner, Freiburg-Betzenhausen, both of Fed. Rep. of Germany

[73] Assignee: Upat GmbH & Co., Emmendingen, Fed. Rep. of Germany

[21] Appl. No.: 423,081

[22] Filed: Sep. 24, 1982

[30] Foreign Application Priority Data

Oct. 6, 1981 [DE] Fed. Rep. of Germany ....... 3139627

[51] Int. Cl.³ .................... C08L 89/00; E21D 20/02
[52] U.S. Cl. .................................. 523/211; 523/210; 524/22; 405/244; 405/261; 411/82
[58] Field of Search ................. 523/210, 211; 524/22; 52/698; 411/82, 258; 405/261, 235, 239, 244

[56] References Cited

U.S. PATENT DOCUMENTS

| | | | |
|---|---|---|---|
| 3,018,258 | 1/1962 | Meier et al. | 523/211 |
| 3,395,105 | 7/1968 | Washburn et al. | 523/211 |
| 3,642,937 | 2/1972 | Deckert et al. | 411/258 |
| 3,702,060 | 11/1972 | Cumming | 405/261 |
| 4,103,771 | 8/1978 | Klatt et al. | 405/261 |
| 4,224,971 | 9/1980 | Muller et al. | 405/261 |

FOREIGN PATENT DOCUMENTS 48-32980 5/1973 Japan .................. 523/211

*Primary Examiner*—Lewis T. Jacobs
*Attorney, Agent, or Firm*—Karl F. Ross; Herbert Dubno

[57] ABSTRACT

Particles of a coloring agent having opaque sheaths which are the color of a mortar mass, are introduced into the reactive mortar mass to signal the distribution of hardener therein.

7 Claims, 1 Drawing Figure

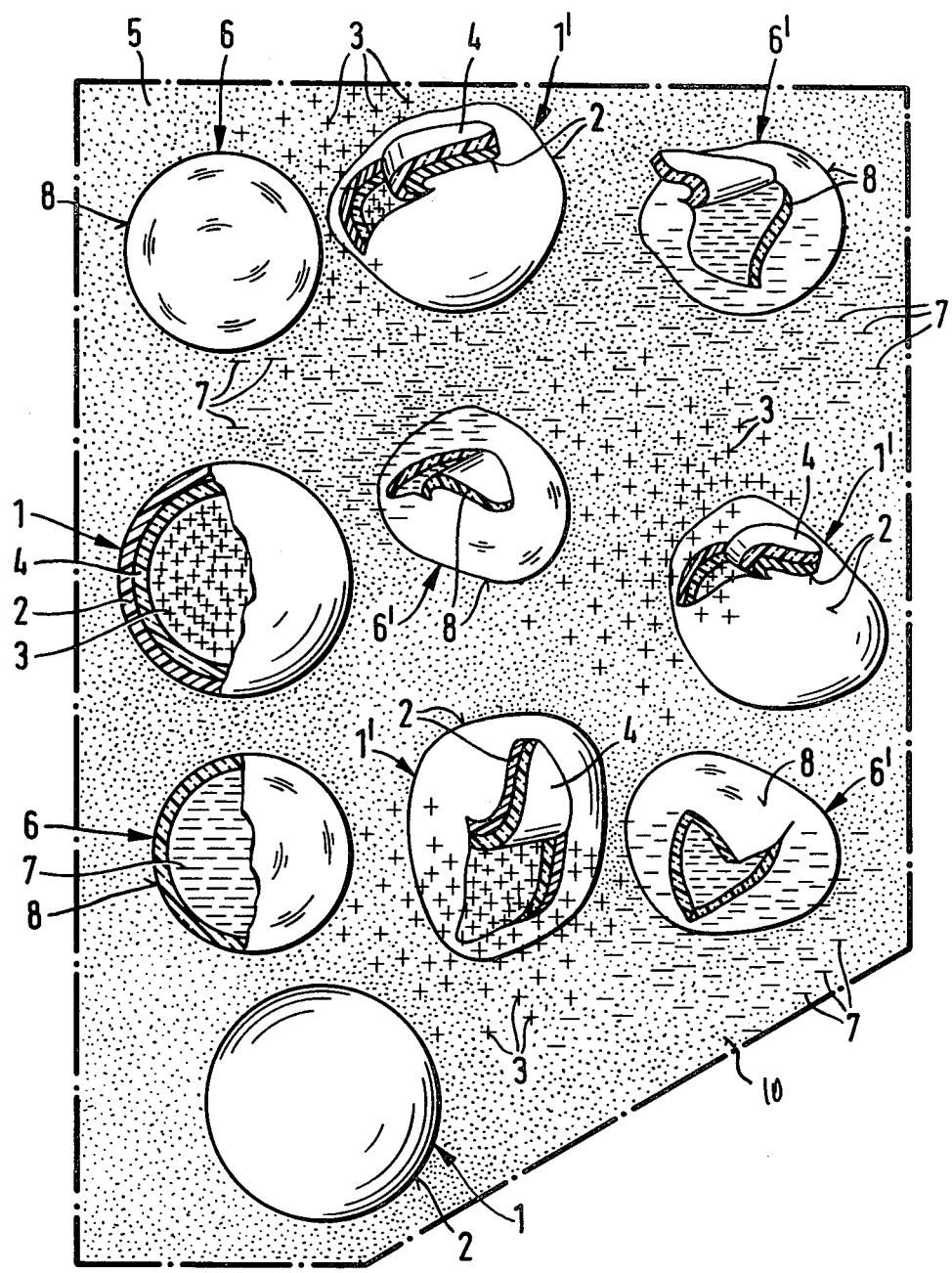

SINGLE-COMPONENT HARDENABLE SYNTHETIC RESIN COMPOSITION AND METHOD OF USING SAME

FIELD OF THE INVENTION

Our present invention relates to single-component settable synthetic resin compositions, especially mortars; and to a method of using such compositions.

BACKGROUND OF THE INVENTION

A single-component settable synthetic resin composition, especially a mortar, may be used for filling spaces between an article to be anchored and the remainder of a wall structure, e.g. in the setting of bolts or the like in which a hole or bore is drilled in a rock structure or the like and a bolt is set in this bore together with a settable synthetic resin mortar.

Synthetic resin settable mortars are used for several purposes as well, e.g. as fillers in crevices, recesses or the like, as compositions for securing rock structures in place, i.e. for grouting and in many other applications where the relatively rapid and firm set or hardening of the composition can be used to advantage and the excellent weathering properties can be exploited as well.

The term "single-component" is used herein not to indicate that the settable composition consists of only one substance, but rather to signal the fact that all of the components of the system are present together in a single composition mass.

For example, a settable synthetic resin composition, e.g. an epoxy resin, comprises an epoxy resin component and an amine or other hardening or curing agent which when intimately dispersed in the epoxy component, will induce a setting or hardening action.

One or both of these components may be included in a composition containing fillers, extenders, diluents, setting retarders, setting accelerants and the like.

Basic to such systems is that the two substances, e.g. the epoxy and the amine, i.e. the resin and its hardener or curing agent, must be intimately mixed to initiate the setting operation.

Of course, before the onset of the setting operation is desired, it is important to maintain the two substances separate from one another.

In the anchoring of bolts for example, it is known to provide a synthetic resin reaction mortar which, in a predetermined quantity, must be introduced into the bore. In one approach, this mortar is held in a glass ampule or other frangible vessel in which the two reactive components, namely the resin and the hardener or curing agent, are held separate from one another.

The glass ampule is inserted into the bore and the shank of a bolt is then driven into the latter to rupture the vessel and, by turning, shaking or even just the initial axial impact, mixes the erstwhile contents of the flask to bring about the intimate contact of the resin and the hardener in a composition position which fills the space between the wall of the bore and the shank of the bolt.

Obviously this system depends for its effectiveness on the thoroughness with which the substances within the vessel are mixed and, since separately held substances cannot be intimately mixed with sureness except with time consuming agitation of the shank and proper determining of the bore and the shank, this technique has not been found to be fully satisfactory.

It is known to premix the hardener and the resin, i.e. the reaction partners, and to then rapidly introduce the mixed composition into the bore. Prior to mixing, the resin and hardener are held in separate vessels and a third vessel is required for the mixing.

Notwithstanding the longer mixing time available with this technique, thorough mixing cannot be assured and, since the mixture has a limited pot life, it is frequently necessary to rush the introduction of the mortar into the hole, to the detriment of the bolting operation. It has already been proposed to introduce a coloring agent into the substance which is utilized in the lesser quantity, usually the hardener, so that the thorough dispersal of the color in the mixture will witness the thorough mixing.

Frequently even this does not yield satisfactory results.

An attempt to overcome this disadvantage has been made by by providing a thixotropic resin phase in which the hardener is previously dispersed in a microencapsulated form. The microcapsules thus include a core constituted by a quantity of the hardener, and a shell or sheath which is frangible or rupturable by mechanical action to release this hardener into the resin phase during the mixing operation.

With this system, however, it is difficult to tell when the mixing has proceeded sufficiently to rupture the desired number of capsules and realize the desired quantity of hardener. Obviously, if an insufficient number of microcapsules are ruptured, the composition may not set fully or have the desired hardness.

To overcome this disadvantage, it has been suggested to utilize color capsules which, upon rupture, release a coloring agent or pigment into the mixture to color the latter. Since the final coloration will indicate the degree of mixing and hence the degree of capsule rupture, this can theoretically provide a solution to the problem addressed earlier.

In practice, however, this system is not at all satisfactory.

Firstly, the color capsule sheaths or shells are transparent and thus a certain hue is delivered to the mass upon dispersal of the capsules in the latter even without the agitation required to rupture the capsules. This hue may be misunderstood and may be interpreted as representing the color of the mixed composition so that hardening may fail entirely or only partial hardening may occur because the colored capsules themselves induce avoidance of further mixing.

Secondly, if the number of these colored capsules per unit volume of the resin phase is insufficient, a fairly light hue will result and this hue may be dominated by the color imparted to the mass by abrasive action on the wall of the bore or the like during agitation of the bolt to rupture the capsules.

Thirdly, when the quantity of capsules is comparatively large, the color developed initially in the mortar may be sufficiently intense as to prevent further increases in intensity from accurately signaling an effective degree of mixing.

OBJECTS OF THE INVENTION

It is, therefore, the principal object of the present invention to provide an improved single-component reaction system and especially a single-component reactive synthetic resin mortar, which eliminates the disadvantages enumerated above and allows careful control of the degree of mixing and hence of activation of the composition.

Another object of our invention is to provide an improved method of using the composition of this invention.

SUMMARY OF THE INVENTION

These objects and other which will become apparent hereinafter are attained in accordance with the invention, in a synthetic resin reactive mortar composition containing a resin phase in which a microencapsulated hardener is dispersed and which, according to the invention, further comprises coloring capsules containing pigmentaceous material and enclosed in sheaths of frangible material such that the sheaths are opaque and have, as a mass, the same color as the mortar composition or mass.

According to the method aspects of this invention, therefore, coloring capsules are added to a mortar mass containing the resin composition and the microencapsulating hardener, so as to act as indicators of sufficient mixing of the hardener with the resin mass upon rupture of the sheaths of the color and hardener microcapsules, the color capsules containing a pigmentaceous material of a color different from that of the mortar mass and having sheaths or shells which are both opaque and the same color as the mortar mass whereby, upon agitation of the mass to rupture these sheaths, the pigmentaceous material is dispersed in the mortar and by changing overall coloration thereof signals the degree of uniformity of the dispersal of the activator or hardener in this mass.

Consequently, the activation indicator is only effective upon agitation of the mass in a manner sufficient to rupture the sheaths both of the hardener microcapsules and the coloring capsules, the inner color represented by the pigmentaceous material only being visible when the sheaths of the coloring capsules are ruptured.

The coloring capsules are preferably of a mass, density and size corresponding to the activator or hardener capsules to ensure that they will distribute statistically in the same manner as the hardener capsules and the sheaths of the hardener capsules can be composed of the same frangible material as the sheaths of the pigmentaceous capsules so that the same degree of frangibility is present for both groups of capsules. Indeed, the sheaths of the coloring microcapsules can be composed of the same material as the sheaths of the hardener capsules and the sheaths of both capsules can include a quantity of filler which may impart the original coloration to the mortar mass. For example, if the mortar mass contains a large amount of titanium dioxide filler and is white, this substance can be included as a filler in the sheaths or shells of the microcapsules so as to color these sheaths the same as the mortar mass prior to release of a pigment from the coloring capsules. The coloring pigment should not, therefore, be white.

BRIEF DESCRIPTION OF THE DRAWING

The above and other objects, features and advantages of the present invention will become more readily apparent from the following description, reference being made to the accompanying drawing the sole FIGURE of which is a diagrammatic perspective view, partially broken away, of a reactive composition according to the invention.

SPECIFIC DESCRIPTION

In the drawing we have shown a multiplicity of coloring capsules dispersed in a synthetic resin mortar composition shown highly diagramatically in the drawing to include a resin mass 5 in which filler particles 10 can be dispersed, this resin mass and the filler particles imparting a certain coloration to the mortar mass.

The latter color contains, according to the invention, hardener microcapsules 6, each of which contains, in liquid form, the hardener 7 which, upon rupture of the sheaths 8, is dispersed in the resin mass and reacts with the latter to form a suitable composition.

The coloring particles 1 each comprise a gelatinous sheath 4 enclosing a pigmentaceous material 3, generally a dyestuff, which can be released in the mass upon rupture of this sheath as shown in the particles 1' to distribute the coloring material in the mass concurrently with the rupture of the sheaths of the hardener particle 6' to release the hardener.

The particles are ruptured by agitation of the mortar mass, e.g. by moving a bolt to agitate the mass after it has been released from a pouch or ampule (not shown) in a hole drilled in a subterranean structure or the like.

According to the invention, the sheath 4 may be colored or the articles 1 may be enclosed in outer layers 2 so that the combination of outer layer and sheath forming a shell around the pigmentaceous material, is both opaque and of the same color as the mortar mass. The outer layer 2 is inert with respect to the overall composition and may as has previously been noted be composed of the same material as the filler 10 dispersed in the mortar mass.

As will be apparent from the drawing, therefore, coloring matter is only visible as the pigmentaceous material 3 is released from the shells and concurrently with release of the hardener upon rupture of the sheaths 8 which can also be composed of gelatin.

In the embodiment shown the hardener particles and the coloring particles are of approximately the same diameter, the coloring matter and the hardener are in a 1:1 volume ratio and equal numbers of the two types of particles are used.

We claim:

1. A reactive synthetic resin mortar composition comprising a mortar mass having a predetermined color and comprising:
    a resin phase in which microcapsules of a hardener reactive with said resin phase are dispersed for rupture of said capsules upon agitation of said mass to disperse said hardener in said resin phase; and
    microcapsules of a coloring agent dispersed in said mass and having opaque shells of said color, said shells being rupturable upon rupture of said microcapsules to release coloring agent into said mass upon the dispersal of said hardener therein.

2. The composition defined in claim 1 wherein said shells comprise inner sheaths enclosing a pigment of a color different from that of said mass, and outer opaque layers of the color of said mass overlying said sheaths.

3. The composition defined in claim 2 wherein said layers are composed of a material forming a filler for said resin phase.

4. A method of anchoring a member in a hole comprising the steps of:
    forming a mortar mass of a reactive resin phase and microcapsules of a hardener reactive with said resin phase and dispersed in said resin phase whereby said mass has a predetermined color;

dispersing in said mass particles consisting of a coloring agent in rupturable shells which are opaque and of said color;

agitating said mass to rupture said shells and said microcapsules and disperse coloring agent and hardener in said resin phase;

terminating the agitation of said mass when the distribution of coloring agent therein as determined from the coloring of the mass signals complete and uniform distribution of said hardener in said resin phase;

introducing said mass and said hardener into a hole so that the resulting composition is hardenable therein; and inserting into said composition in said hole a member which is anchored in said hole by the hardening of said composition.

5. The method defined in claim 4 wherein the particles introduced into said mass are substantially equal in number of said microcapsules.

6. The method defined in claim 4 or claim 5 wherein the particles of coloring agent introduced into said mass are of substantially the same size as said microcapsules.

7. The method defined in claim 6 wherein said particles have inner gelatin sheaths and outer layers which are opaque, each inert in said mass, and are the color of said mass.

* * * * *